May 18, 1965 R. H. BENEDICT 3,184,744
AUTOMATIC RADIO DIRECTION FINDER
Filed Feb. 1, 1963 2 Sheets-Sheet 1

INVENTOR.
RICHARD H. BENEDICT
BY Darby & Darby
ATTORNEYS

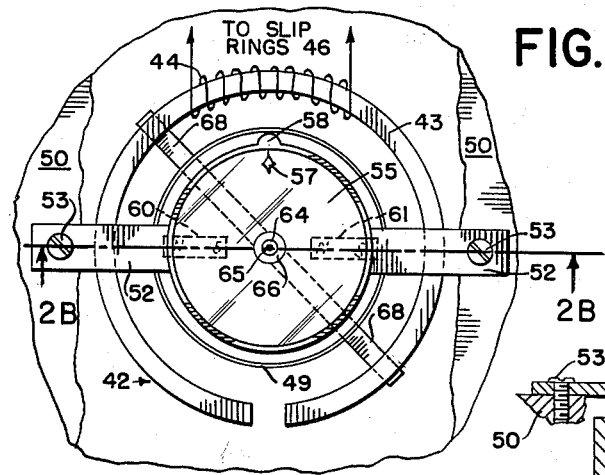
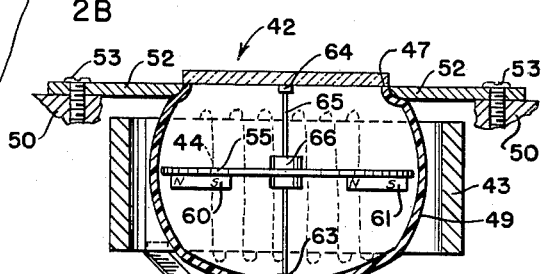
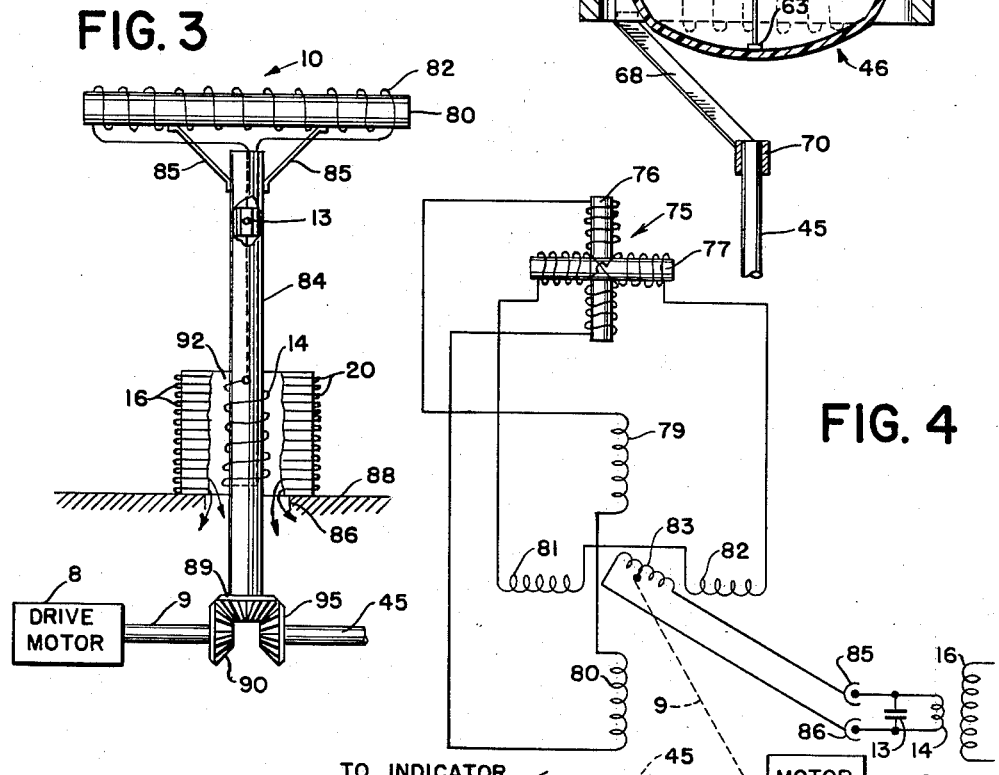

United States Patent Office 3,184,744
Patented May 18, 1965

3,184,744
AUTOMATIC RADIO DIRECTION FINDER
Richard H. Benedict, 3965 Sedgwick Ave., Bronx, N.Y.
Filed Feb. 1, 1963, Ser. No. 255,608
7 Claims. (Cl. 343—113)

This invention relates to radio direction finder apparatus and more particularly to a radio direction finder using a rotating antenna pattern and a simplified indicator device.

There are many types of radio direction finders currently in use, all of which operate on the same basic principle of using a radio receiver in combination with a directive antenna to produce an indication of the direction from which a radio signal is being transmitted. In direction finders of the so-called searching type the antenna pattern is made to rotate at a relatively high speed and the angular direction of the station with respect to the vehicle carrying the direction finder is indicated once for each revolution of the main lobe of the antenna pattern past the transmitting station. This is indicated in the receiver by the production of a maximum amplitude signal in accordance with the directional antenna system receiving maximum signal amplitude. The indicator of the direction finder is positioned in accordance with the maximum signal so that the operator of the vehicle has a visible indication of the direction of the station.

In another type of direction finder of the so-called null seeking type, a directive antenna is made to hunt a null signal position with respect to the transmitted signal rather than be continuously searching as in the type of system described above. The null-seeking system uses a servomechanism to position the antenna and also to provide a remote readout of the antenna's angular position when the null is sensed in order to indicate the bearing of the station.

In all types of radio direction finders, it is highly desirable to provide a sensitive indicator device in order that the direction of the station may be displayed with a high degree of accuracy. In the continuously searching type of system, an indicator light such as a neon bulb may be rotated in synchronism with the antenna and flashed every time that maximum signal amplitude is detected. While this arrangement is relatively simple, it has several disadvantages. First of all, the bulb cannot be readily seen under strong ambient light conditions. Also, the accuracy of bearing representation provided is not too good because of the tendency of the light to blur over a few degrees of arc as it rotates. In the null seeking type of system a servomechanism system is controlled by the receiver output signal to position the indicator. While such servomechanism systems, which could also be used with a searching type direction finder, achieve the desired degree of accuracy, their cost is relatively high. This increases the cost of the radio direction finder and in many cases puts it in a high price range.

The present invention is directed to a radio direction finder of the continuously searching type which uses a simple and accurate indicator device. In accordance with the invention, the indicator is a modified compass whose magnetic members are oriented by the flux produced in a solenoid which is rotated in synchronism with a loop antenna. The flux serves to orient the pointer on the compass indicator card to the direction of the station from which the signal received by the direction finder was picked up. This arrangement, which is relatively simple, provides a clearly visible bearing indication and also eliminates the need for complex servomechanism systems while still providing accurate bearing indications. Thus, a considerable saving may be obtained in the construction of the direction finder of the present invention over other similar types of direction finders.

It is therefore an object of this invention to provide a radio direction finder having a relatively simple type of indicator device.

Another object of the present invention is to provide a radio direction finder having a loop antenna and an indicator, with the loop antenna and a part of the indicator being rotated together to produce the bearing indication.

Still a further object of the invention is to provide a radio direction finder having an indicator which is in the form of a solenoid which is rotated in synchronism with the direction finder antenna, and whose flux varies in accordance with the magnitude of the received signal, the flux being used to position a pointer on the indicator to show the bearing of the transmitting station.

Other objects and advantages of the present invention will become more apparent upon reference to the following specification and annexed drawings in which:

FIGURES 2A and 2B are views of the indicator, taken partially in section, of a preferred form of indicator for use with the system;

FIGURE 3 is a view of one form of loop antenna for used with the system; and

FIGURE 4 shows another embodiment of the invention.

Figure 1:
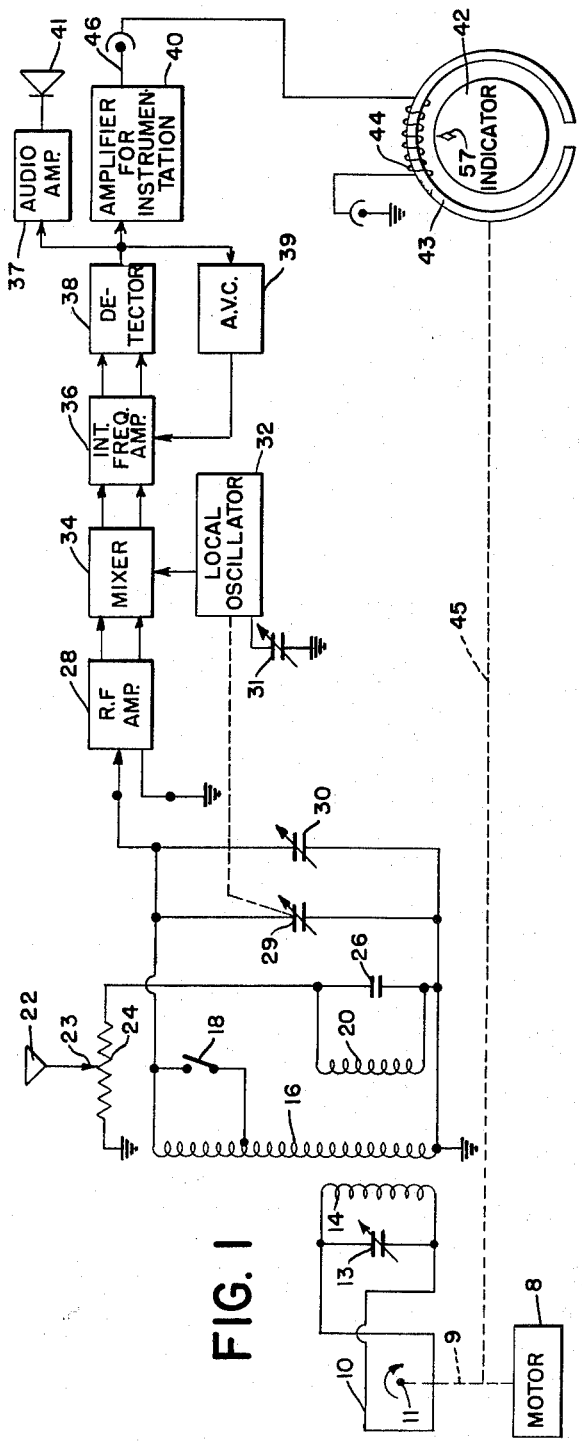
FIGURE 1 is a schematic diagram, partially in block form, of the radio direction finder of the present invention.

Referring first to FIGURE 1, the rotating antenna pattern is formed by a loop antenna 10 which is rotated about its axis 11 at a predetermined speed, for example, 400 revolutions per minute, by a motor 8 which drives a shaft 9. A parallel resonant circuit formed by a tunable capacitor 13 and primary coil 14 is connected to and rotates with the loop 10. The resonant circuit 13, 14 is tuned to have its resonant frequency above the frequency band of operation which, for example, is preferably the broadcast band which extends from 550 kilocyles to 1600 kilocycle. This makes the circuit 13, 14 have a low impedance to received signals in the broadcast band and below.

The signal picked up by the rotating loop 10 is inductively coupled from the primary coil 14 into a stationary secondary coil 16. A single-pole single-throw switch 18 is connected across a portion of the secondary coil 16. When the switch is open, the system operates in a lower frequency band, called the range band which lies between 190–400 kilocycles, and when it is closed the system operates in the broadcast band.

The signal received by an omni-directional (vertical) sense antenna 22 is supplied through the center arm 23 of a voltage divider 24 to a stationary tertiary coil 20 which is also inductively coupled to the stationary secondary coil 16. A capacitor 26 connected across the tertiary coil 20 resonates the circuit 20, 26 at a frequency below the range band so that reactance of this circuit is effectively capacitive, with the current leading the voltage, to signals at all frequencies of operation.

The interaction of the rotating loop antenna 10 and the omni-directional sense antenna 22 produces a modified unidirectional cardioid pattern as the respective antenna signals are mixed in the second coil 16. As is known, the omni-directional sense antenna 22 produces a circular field pattern with the antenna at the center of the circle, while the field pattern of the loop antenna 10 is in the shape of a figure-eight formed by two substantially circular lobes. Received signals which are induced in the omni-directional sense antenna 22 are in phase with the flux of the received signal wave while the received signals induced in the loop antenna 10 are 90° out of phase with the flux of the received signal wave. The output of the loop antenna also reverses phase as the loop is rotated past each null position on the pattern between the two circular lobes. Therefore, on one side of the null position the loop output leads the flux by 90° while on the other side of the null it lags the flux by 90°.

A signal transmitted by a station which arrives at right angles to the plane of the loop 10 induces equal but opposite phase currents in the loop arms. Therefore, the loop output will be at a null (zero) and two nulls will occur 180° apart, because of the loop radiation pattern, during one revolution of the loop. A signal received by the doop 10 when its plane is in line with the transmitted signal will provide maximum signal output because the currents in the loop arms are in phase. Here also, two maximum points will occur 180° apart as the loop rotates.

The signal received by the sense antenna 22 is retarded in phase by 90° with respect to the loop antenna signal, by the tuning of resonant circuits 13, 14 and 20, 26, as the two signals are mixed in the secondary coil 16. The sense antenna signal is therefore in phase or 180° out of phase with the loop signal depending upon which side of the loop faces the direction of the incoming signal wave. When the loop and sense antenna signals are mixed in the secondary coil 16, one of the two signal lobes of the loop antenna is phased out and a modified unit-directional cardioid antenna pattern is produced. This pattern rotates as the loop is turned by the motor 8. The voltage divider 24 connected to the sense antenna 22 serves as a gain control for the sense antenna signal and also acts as an impedance match between the antenna and the tuned resonant circuit 20, 26. Thus, only one point of maximum signal pickup will be produced for each 360° rotation of the loop since a single lobe, directional antenna pattern is provided. This maximum signal is used to drive an indicator to produce an indication of the transmitting station with respect to the vehicle carrying the loop antenna and the direction finder.

The output from the secondary coil 16 is coupled to the radio frequency amplifier portion 28 of a superheterodyne type receiver. The superheterodyne receiver is of conventional construction and in itself forms no part of the present invention. Therefore, only a brief description will be given with a more detailed description being available from any standard radio engineering textbook. The radio frequency amplifier 28 is tuned by two capacitors 29 and 30 which are mechanically ganged or connected to the tuning capacitor 31 of a local oscillator 32. The output signals of the amplifier 28 and local oscillator 32 are combined in a mixer circuit 34 whose output is the intermediate frequency (I.F.) signal. This I.F. signal is amplified by one or more suitable I.F. amplifier stages 36 and the output of the last stage is applied to a detector 38. As is known, the detector 38 produces a signal whose amplitude varies in accordance with the intensity of the signal received by the two antennas 10 and 22. The detector output signal will have only one point of maximum value for each 360° rotation of the loop 10 because of the directivity of the single lobe antenna pattern.

The detector has three outputs, the first of which goes through an audio amplifier 37 to a speaker 41 to provide an aural indication of the received signal. The second output is applied through an automatic volume control (A.V.C.) circuit 39 to adjust the gain of the intermediate frequency amplifiers to vary input signal levels. The A.V.C. circuit 39 is made slow reacting in order not to distort the shape of the antenna pattern as it searches. The third output of the detector is supplied to an indicator 42 through one or more stages of suitable instrumentation amplifiers 40, which are of the audio frequency type, to amplify the detected signal. The output of the amplifier 40 is a pulsating direct current signal which is used to energise a rotating solenoid 43 associated with the indicator 42.

As shown diagrammatically in FIGURE 1, and as will be described in greater detail below, the indicator 42 has a rotating magnetic solenoid core 43 which is driven by the motor 8 through a shaft 45 in synchronism with the loop 10. The solenoid core has a control winding or coil 44 wound thereon which receives the signal from the amplifier 40 through a set of slip rings 46. The slip rings 46 may be of any conventional type and no further description thereof is necessary. Therefore, as the solenoid core 43 rotates under control of the shaft 45, the amount of flux produced in the core varies in accordance with the intensity of the signals received by the antennas. The flux in the solenoid core 43 will be maximum when the loop antenna 10 has its plane directed toward the transmitting station and is therefore receiving maximum signal. This will occur only at one point during each 360° rotation of the loop. The indicator 42 also has a display device which reacts to the flux in the solenoid so that the display is aligned and positioned by this flux.

A preferred form of indicator 42 for use in the system is shown in FIGURES 2A and 2B. The indicator is a modified magnetic compass 46 having a transparent window 47. The compass is preferably of the liquid type and it is damped by a suitable fluid such as light oil. The compass 46 is held by suitable fastening means (not shown) within a housing 49 which is made of a material such as plastic or brass which will not react with the flux in the solenoid. The compass indicator is preferably mounted vertically with respect to the front of a case 50 which houses the direction finder, or is an indicator panel on the vehicle, by two flanges 52 which are fastened on the compass housing 49 and two screws 53. Any other suitable fastening arrangement may be used, if desired. The compass indicator 46 also has a compass card 55 which has a pointer 57 thereon to indicate the direction of a transmitting station at any point over a 360° arc. A bubble chamber 58 is also provided in the compass housing in the well known manner.

Two permanent magnets 60 and 61, which may be of the Alnico type, are mounted on the underside of the compass card 55. The card 55 and its magnets are supported by two bearings 63 and 64 which are fastened to the top and bottom of the compass at its center. Each bearing holds a shaft 65 which is connected to another bearing 66 mounted on the top and underside of the compass card. Thus, since the card is supported by the bearings, the compass 46 may be placed vertical, in the manner shown in FIGURE 2A, without the card 55 touching the side of the housing. If desired, several counterweights may be mounted on the underside of the compass card to balance the weight of the magnets 60 and 61. A single counterweight may be located 90° from each of the magnets or a series of counterweights may be spaced around the card.

The rotating solenoid 43 is mounted around the outside of the housing by two or more supports 68 which are held to the shaft 45 by a clamp 70. As shown in FIGURE 2A, the solenoid core 43 is not continuous and the control winding 44 is wound at about the center section of the core. The two ends of winding 44 are brought out to the slip rings (not shown) so that the coil 44 is supplied with the output signal from the amplifiers 40. Thus, the solenoid acts as a magnet whose flux varies in accordance with the intensity of the detector and amplifier output signal. This flux interacts with the two magnets 60 and 61 to position the compass card 55.

Since the solenoid core 43 rotates in synchronism with the loop 10, the solenoid will have maximum flux at the same time that the loop is picking up maximum signal amplitude from the direction of the transmitting station. Therefore, the two magnets 60 and 61 on the compass card will interact with the flux in the core to overcome the viscous friction of the fluid in the compass and align the card 55 in accordance with the flux in the core 43. It should be understood that the pointer 57 is so placed on the card and the magnets 60 and 61 so located with respect to the control coil 44 on the solenoid that the pointer will point toward the direction of the station transmitting the received signal. This means that the card aligns itself at the time that maximum flux is produced in the solenoid core. In the normal system the magnets 60 and 61 are spaced 180° apart and aligned with their magnetic N-S poles in the directions shown in FIGURE 2A and the pointer 57 is located midway between the two magnets. With no signal being applied to the system and the plane of the loop 10 pointing at 0°, the compass card should line itself up with the pointer 57 opposite the control winding 44 at the 0° position. If any phase shifts are introduced by the various components of the system, or by other effects, which would alter the position of the pointer 57 from the station, these may be compensated for by shifting the initial position of the solenoid with respect to the loop. This adjustment need be made only once for each installation before the system is used.

It should be understood that the compass card is aligned with the maximum solenoid flux one time for each rotation of the loop antenna 10 since maximum signal amplitude is produced by the detector 38 each time the loop rotates past the signal from the station. Because of the relatively high rotation rate of the loop 10 and the solenoid 43 and the damping provided by the fluid in the compass 46, the compass card 42 will continuously maintain its position with the pointer 57 pointing in the direction of the station even during the times when maxmum flux is not being produced. Therefore, the direction of the station is continuously indicated by the pointer 57.

An external, manually rotatable azimuth scale (not shown) may be mounted around the compass housing 46. The azimuth scale is used to connect the bearings obtained by the pointer 57, which are related to the heading of the vessel carrying the direction finder, to bearings related to magnetic north. In operation, the azimuth scale is manually rotated to coincide with the magnetic bearing of the vehicle. Then the bearing of the direction finder relative to magnetic north may be read directly from the azimuth scale.

FIGURE 3 shows a preferred arrangement for the loop antenna 10. In this case, the loop is formed by a ferrite core 80 over which is wound the antenna loop winding 82. The core 82 is held on a rotating shaft 84 by a plurality of supports 85 which are mechanically fastened to the shaft and the core. The leads from the end of the winding 82 pass inside the shaft 84 to a point near the bottom where they are brought out through the shaft and are connected to the primary coil 14 which is held to the shaft 84 by a suitable insulating device (not shown) to rotate therewith. The capacitor 13, which is used to resonate the primary coil 14, is connected across the ends of winding 82 and may be located either inside or outside of the shaft.

When the antenna 10 is to be mounted outside of the vehicle, the shaft 84 extends through a hole 86 in the mounting plate 88 or deck of the vehicle. Of course, the loop can be mounted within the vehicle if the material of the vehicle does not block the reception of electromagnetic energy. A bevel gear 89 is connected to the end of the shaft 84 opposite the ferrite core. This gear mates with another gear 90 on the end of shaft 9 connected to the motor 8, so that the shaft 84 is driven by the motor. The secondary coil 16 and the tertiary coil 20 are wound over a form 92 which is fixedly mounted to the plate 88. When the antenna is mounted externally of the vehicle, the whole assembly of shaft 84, core 80 and form 92 can be covered by a radome or shell to keep water from affecting the system. The three coils 14, 16 and 20 are inductively coupled and the primary coil 14 rotates with respect to the stationary coils 16 and 20. Connections from the stationary coils 16 and 20 are made in the manner shown in FIGURE 1.

While a particular type of loop antenna is shown in FIGURE 3, it should be recognized that other types may be used to produce the unidirectional pattern. It has been found that the loop antenna of FIGURE 3 is highly efficient and is relatively small for use on the broadcast and the range band. The sense antenna 22 (not shown) is preferably a vertical unipole antenna which is also mounted on the vehicle in any suitable manner. Of course, the exact design and dimensions of the antenna will depend upon the frequency band with which the system is to operate.

The shaft 45 for the solenoid 43 is driven by a gear 95 connected at the end thereof which engages the gear 89. Therefore, shaft 45 and the solenoid 43 are driven in synchronism with the loop 10. When the indicator is mounted vertically, as shown in FIGURE 2A, the end of the shaft 45 is connected directly to the solenoid core 43. If the indicator 42 is to be mounted horizontally, a right angle drive gear connection is provided at the end of shaft 45 and at the solenoid core 43.

The principles of the present invention may be applied to systems other than those using a rotating loop antenna. FIGURE 4 shows an embodiment wherein the signal for the receiver is picked up by a goniometer type system having a stationary cross-loop antenna 75 with cross-arms 76 and 77. The cross-loop antenna 75 produces a figure-eight pattern. The output leads of cross-arm 76 are connected to the ends of two series connected stator coils 79 and 80. Similarly, the output leads of cross-arm 77 are connected to two series connected stator coils 81 and 82 which are mounted in quadrature (90°) relationship with respect to the first two coils. Therefore, the signal received by antenna 75 is coupled to the four stator coils in proportion to the signal induced in each cross-arm 75 or 76.

The stationary stator coils 79, 80, 81 and 82, together with a rotating searching coil 83 form a resolver which produces a signal to be supplied to the receiver of FIGURE 1. The searching coil 83 is rotated by the shaft 9 and mechanical coupling is made with the indicator 42 by shaft 45 in the manner previously described. The voltage induced in the searching coil 83 as it rotates is the algebraic sum of the voltages of the quadrature mounted stator coils. This effectively duplicates the rotating pattern of the loop antenna of FIGURE 1. An amount of voltage is present in each stator coil dependent upon the direction of the incoming wave from the bearing station with respect to the cross-arms of the stationary antenna. The voltage induced in search coil 83 is taken off through a set of slip rings 85 and 86 and applied to the tuned resonant circuit formed by capacitor 13 and primary coil 14'. The capacitor 13 is the same as in FIGURE 1, but the primary coil 14 is now stationary since the rotating coil 83 serves the purpose of inducing the rotating antenna pattern voltage. The remainder of the system operates as previously described with respect to FIGURES 1, 2 and 3.

It should be understood that the stationary crossed-arm antenna 75 is preferably mounted some distance away from the resolver. Also, the wires connecting the crossed-arms and the stator coils are preferably shielded cables. By using the goniometer of FIGURE 4, or any other similar type capable of effectively producing a rotating pattern, the indicator 42 can be driven without the need of the rotating loop assembly. In some cases, this is a decided advantage because of space, weight and other considerations.

Therefore it can be seen that a radio direction finder has been provided which has a simplified display device for indicating the bearing of the transmitting station. Tests conducted with the indicator device have shown that it is extremely accurate and stable even in view of its relative simplicity. The radio direction finder and indicator of the present invention may be used at any desired operating frequency, by suitably selecting the dimensions of the antennas and tuned circuits. Also, any rotational speed, within mechanical limitation, of the loop 10 or search coil 83 may be used to obtain stability of the indicator.

While preferred embodiments of the invention have been described above, it will be understood that these are illustrative only, and the invention is limited solely by the appended claims.

What is claimed is:

1. A radio direction finder system for indicating the bearing of a station transmitting a signal comprising means having a directive characteristic for receiving said transmitted signal, means for rotating said receiving means to receive the transmitted signal modulated in amplitude in accordance with the directive characteristic and the rotation of the receiving means, means connected to said receiving means for detecting the amplitude modulated signal produced thereby, indicator means comprising a movable indicating device having magnetically responsive means mounted thereon for positioning said device, bearing means mounted on said indicator means to hold said indicating device while permitting rotation thereof, a solenoid including a core and a coil for producing magnetic flux to react with said magnetically responsive means to position said movable indicating device, means connected to said solenoid for rotating it in synchronism with the rotating receiver means, said solenoid core being generally C-shaped and positioned to form a magnetic flux path around said magnetically responsive means as said solenoid is rotated whereby the effect of the terrestial magnetic field on said magnetically responsive means is reduced, means connecting said detecting means to said coil and applying said amplitude modulated signal thereto whereby said solenoid produces magnetic flux in accordance with said signal to position the movable indicator device to indicate the bearing of the station.

2. A radio direction finder system for indicating the bearing of a station transmitting a signal comprising antenna means having a directive pattern to receive said transmitted signal, means for periodically rotating said antenna means to receive the transmited signal modulated in amplitude in accordance with the directive pattern of the rotating antenna means, means connected to said antenna means for detecting the amplitude modulated signal produced thereby, means including means rotatable with said antenna means for inductively coupling the received transmitted signal to said detecting means, indicator means comprising a housing, an indicating device located within said housing, bearing means mounting said indicating device for rotation within said housing, a pair of permanent magnets mounted diametrically opposite each other on said indicating device, a quantity of a liquid within the housing to damp the movement of the indicating device, rotatable magnetic flux producing means having a portion thereof mounted outside of said housing and partially surrounding the housing for producing magnetic flux to react with the pair of magnets for positioning said indicating device, means connected to said magnetic flux producing means for rotating it in synchronism with the rotating antenna, means connecting said detecting means to said flux producing means whereby said flux producing means receives the amplitude modulated signal and produces magnetic flux in accordance therewith to position the movable indicator device.

3. A radio direction finder system for indicating the bearing of a station transmitting a signal comprising antenna means having a directive pattern to receive said transmitted signal, means for periodically rotating said antenna means to receive the transmitted signal modulated in amplitude in accordance with the directive pattern of the rotating antenna means, means connected to said antenna means for detecting the amplitude modulated signal produced thereby, indicator means comprising a movable indicating device carrying magnetically responsive means for positioning said device, solenoid means for producing magnetic flux to position said movable indicating device, said solenoid means including a core and a coil mounted thereon, means connected to said solenoid means for rotating it in synchronism with the rotating antenna, said solenoid core being generally C-shaped and positioned to form a magnetic flux path around said magnetically responsive means as said solenoid is rotated whereby the effect of the terrestrial magnetic field on said magnetically responsive means is reduced, means for applying the amplitude modulated signal from said detecting means to said coil whereby said solenoid produces magnetic flux in accordance with said signal to position the movable indicator device to indicate the bearing of the station.

4. A radio direction finder system for indicating the bearing of a station transmitting a signal comprising radio goniometer means having a directive pattern to receive said transmitted signal, means for periodically rotating a portion of said goniometer means to produce a representation of the received transmitted signal which is modulated in amplitude in accordance with the directive pattern of the goniometer means and the rotation portion thereof, means connected to said goniometer means for detecting the amplitude modulated signal produced thereby, indicator means comprising a movable indicating device carrying magnetically responsive means for positioning said device, solenoid means for producing magnetic flux to position said movable indicating device, said solenoid means including a core and a coil mounted thereon, means connected to said solenoid means for rotating it in synchronism with the rotating portion of the goniometer, said solenoid core being generally C-shaped and positioned to form a magnetic flux path around said magnetically responsive means as said solenoid is rotated whereby the effect of the terrestrial magnetic field on said magnetically responsive means is reduced, means connecting said detecting means to said coil for applying the amplitude modulated signal thereto whereby said solenoid produces magnetic flux in accordance with said signal to position the movable indicator device to indicate the bearing of the station.

5. A radio direction finder as in claim 1 wherein the rotating antenna includes a rotatable means for inductively coupling the received transmitted signal to said detecting means.

6. A radio direction finder as in claim 1 wherein liquid damping means are provided for the indicator means.

7. A radio direction finder system as in claim 2 wherein the portion of the rotatable magnetic flux producing means formed of a magnetically responsive material which shields the pair of permanent magnets from the magnetic field of the earth.

References Cited by the Examiner

UNITED STATES PATENTS

| 2,036,444 | 4/36 | Tolson | 343—118 X |
| 2,287,623 | 6/42 | Klein | 343—118 |
| 2,445,786 | 7/48 | Libby et al. | 343—118 |

FOREIGN PATENTS

| 841,860 | 2/39 | France | 343—118 |
| 951,076 | 4/49 | France | 343—118 |

CHESTER L. JUSTUS, Primary Examiner.

KATHLEEN CLAFFY, Examiner.